July 14, 1925.

J. C. HUGULEY

DISH HOLDING TONGS

Filed June 19, 1924

1,546,076

Inventor

JOB C. HUGULEY.

By A. B. Bowman

Attorney

Patented July 14, 1925.

1,546,076

UNITED STATES PATENT OFFICE.

JOB C. HUGULEY, OF SAN DIEGO, CALIFORNIA.

DISH-HOLDING TONGS.

Application filed June 19, 1924. Serial No. 720,963.

*To all whom it may concern:*

Be it known that I, JOB C. HUGULEY, a citizen of the United States, residing at San Diego, in the county of San Diego and State of California, have invented certain new and useful Dish-Holding Tongs, of which the following is a specification.

My invention relates to dish-holding tongs particularly adapted for use for holding dishes such as chinaware, cooking utensils and the like while washing the same, and the objects of my invention are: first, to provide dish-holding tongs of this class which are so shaped and constructed that they firmly grip the dish so that it will not slip; second, to provide a dish-holding tongs of this class with one of the gripping members relatively broad and the other gripping member relatively narrow and made in U-shaped cross-section and provided with a rubber cover, and a hole in the broad member serving to hang the tongs up so that the water will drain from the cover member and also serve to adhere to the dish; third, to provide dish-holding tongs of this class in which both of the gripping members are curved in conforming manner adaped to engage the curve or dished edges of dishes; fourth, to provide a dish-holding tongs of this class which may be stamped from metal and made strong and durable from two pieces of sheet metal; fifth, to provide a novelly constructed dish-holding tongs, and sixth, to provide tongs of this class which are simple and economical of manufacture and operation, durable, efficient, and which will not readily deteriorate or get out of order.

Figure 1:
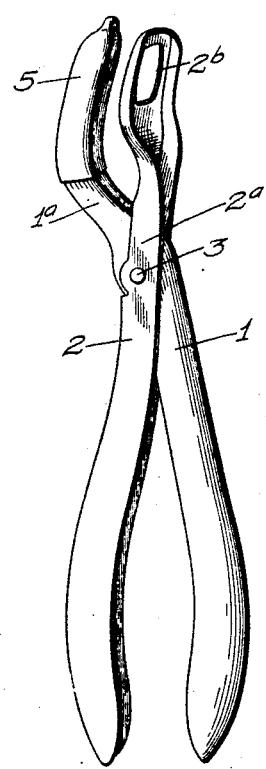
Figure 2:
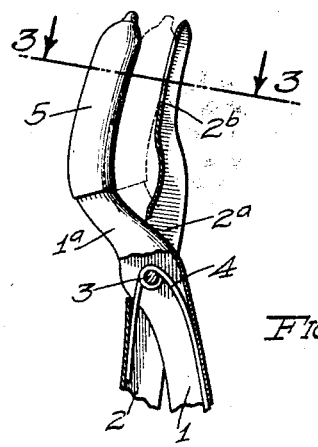
Figure 3:
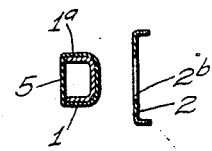

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a perspective view of my dish-holding tongs with the gripping end up; Fig. 2 is a partial elevational and partial sectional view of a fragmentary portion of the gripping tongs, showing the spring tending to hold the gripping members apart and showing by dotted lines, varying relative positions of the gripping members, and Fig. 3 is a sectional view through 3—3 of Fig. 2.

Like characters of reference refer to similar parts and portions throughout the several views of the drawings.

The tong member 1, tong member 2, pin 3, spring 4, and cover member 5, constitute the principal parts and portions of my dish-holding tongs. The member 1 is preferably U-shaped in cross-section and is provided with holes adapted for the pin 3. Said member is also provided with a curved portion $1^a$ with the channel portion of the U outwardly as shown. Mounted over the end of the portion $1^a$ of the member 1 is a thimble or cup-shaped rubber member 5, which serves as a resilient member and also as an adhesive so that the device adheres to the dish. This member 5 is stretched over the gripping end of the tong member 1 so that it is supported rigidly thereon. The member 2 is also a U-shaped member, but is provided with a hole therethrough adapted to permit the movement of the member 1 therein so that the members are pivotally connected together by means of the pin 3, the member 1 being mounted between the bifurcated portions $2^a$ of the member 2. This member 2 is provided with a curved portion which curves toward the portion $1^a$ and is also broadened at the end as shown and provided with backwardly extending flanges for reinforcing. It is provided with a hole therein which tends to grip the dish and also serves for a hanger for hanging the tongs up, being hung with the gripping end up so that all the water will drain from the member 5. Mounted on the pin 3 is a spring 4, which is wound around the pin, and one end engages the channel side of the member 1, the other end the member 2 in the channel side, as shown best in Fig. 2 of the drawings. The extended ends of the members 1 and 2 are curved to conform to the hand and provide comfort for the user in holding when in either the gripping or open position.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In a dish-holding tongs, a pair of members pivotally connected intermediate their ends, and spring means tending to hold them in certain pivotal relation to each other, the one end of one of said members only being provided with a resilient adhesive cup shaped cover member, the other member being provided with a relatively wide flat surface adapted to engage the cover member.

2. In a dish-holding tongs, a pair of members pivotally connected intermediate their ends, and spring means tending to hold them in certain pivotal relation to each other, the one end of one of said members being provided with a resilient adhesive cover member, the other member being provided with a relatively wide flat surface adapted to engage the other member and also provided with a hole in said relatively wide portion.

3. A pair of members U-shaped in cross-section, each provided with a handle end and a gripping end, pivotally connected together intermediate their ends, with the channel portions inwardly at the handle ends and outwardly at the gripping ends and the members curved with conforming curves at said opposite ends, one of said members being relatively narrow and provided with an adhesive resilient cover over the gripping end thereof, the other of said members being relatively broad provided with a hole therethrough at the gripping end.

4. A pair of members U-shaped in cross-section, each provided with a handle end and a gripping end, pivotally connected together intermediate their ends, with the channel portions inwardly at the handle ends and outwardly at the gripping ends and the members curved with conforming curves at said gripping ends, one of said members being relatively narrow and provided with an adhesive resilient cover over the gripping end thereof, the other of said members being relatively broad and provided with a hole therethrough at the gripping end and a spring means wound around the pivotal mounting and engaging the separate member tending to hold the gripping end of said members apart.

In testimony whereof, I have hereunto set my hand at San Diego, California, this 13th day of June, 1924.

JOB C. HUGULEY.